US012698351B2

(12) United States Patent
Fischer

(10) Patent No.: US 12,698,351 B2
(45) Date of Patent: Aug. 4, 2026

(54) PROCESS FOR PRODUCING A THERMOPLASTIC MOULDING COMPOUND COMPRISING A THERMOPLASTIC COPOLYMER A AND A GRAFT COPOLYMER B

(71) Applicant: INEOS STYROLUTION GROUP GMBH, Frankfurt am Main (DE)

(72) Inventor: Wolfgang Fischer, Heidelberg (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 338 days.

(21) Appl. No.: 18/546,728

(22) PCT Filed: Feb. 15, 2022

(86) PCT No.: PCT/EP2022/053705
§ 371 (c)(1),
(2) Date: Aug. 18, 2023

(87) PCT Pub. No.: WO2022/175283
PCT Pub. Date: Aug. 25, 2022

(65) Prior Publication Data
US 2024/0218090 A1 Jul. 4, 2024

(30) Foreign Application Priority Data

Feb. 16, 2021 (EP) ...................................... 21157467

(51) Int. Cl.
*C08F 6/22* (2006.01)
*B01D 21/26* (2006.01)
(Continued)

(52) U.S. Cl.
CPC .............. *C08F 6/22* (2013.01); *B01D 21/262* (2013.01); *C08F 6/00* (2013.01); *C08F 6/005* (2013.01);
(Continued)

(58) Field of Classification Search
CPC .......... C08F 6/22; C08F 6/008; C08F 212/10; C08F 257/02; C08F 6/005; C08F 6/00;
(Continued)

(56) References Cited

U.S. PATENT DOCUMENTS 2,897,183 A 7/1959 Christl et al.
4,009,226 A 2/1977 Ott et al.
(Continued)

FOREIGN PATENT DOCUMENTS

CN 1508501 A 6/2004
DE 1260135 B 2/1968
(Continued)

OTHER PUBLICATIONS

Krischer/Kroell, Trocknungstechnik (Zweiter Band), Trockner und Trocknungsverfahren, Springer-Verlag, 1959, p. 275-282; the relevance of which is discussed on pp. 4 and 25 of the English-translation of the specification.
D. Gehrmann, et al., Trocknungstechnik in der Lebensmittelindustrie (Behr's Verlag GmbH & Co.KG, 1. Auflage 2009, Abschnitt 2.5.3, Statische Wirbelschichttrockner, p. 143-145; the relevance of which is discussed on pp. 4 and 26 of the English-translation of the specification.
(Continued)

*Primary Examiner* — Rabon A Sergent

(57) ABSTRACT

The invention relates to a process for producing a thermoplastic moulding compound comprising a thermoplastic copolymer A and a graft copolymer B (4), comprising: continuously drying the dewatered graft copolymer B (4) by supplying a drying gas (3) and the dewatered graft copolymer B (4), by moving the dewatered graft copolymer B (4) through the drying gas (3) and forming a fluidized bed (5), the drying gas (3) having a feed temperature $T_{G,feed}$ in the range from 50° C. to 160° C., and by removing dried graft copolymer B (4) and an offgas (7), wherein i. a starting temperature $T_{in}$ of the fluidized bed (5) on feeding (9) of the dewatered graft copolymer B (4) is measured, ii. a finish temperature $T_{out}$ of the fluidized bed (5) on removal (11) of the dried graft copolymer B (4) and/or of the offgas (7) is measured, iii. a difference $\Delta T_{act}$ between the finish temperature $T_{out}$ and the starting temperature $T_{in}$ is formed and the difference $\Delta T_{act}$ is compared with a target value $\Delta T_{target}$, and iv. the finish temperature $T_{out}$ is adjusted by—increasing a mass flow rate of drying gas (3) supplied and/or the feed temperature $T_{G,feed}$ of the drying gas (3) when the difference $\Delta T_{act}$ is smaller than the target value $\Delta T_{target}$ or—reducing a mass flow rate of drying gas (3) supplied and/or the feed temperature $T_{G,feed}$ of the drying gas (3) when the difference $\Delta T_{act}$ is greater than the target value $\Delta T_{target}$.

19 Claims, 1 Drawing Sheet

(51) Int. Cl.

| | |
|---|---|
| *C08F 6/00* | (2006.01) |
| *C08F 212/10* | (2006.01) |
| *C08F 257/02* | (2006.01) |
| *C08L 25/12* | (2006.01) |
| *C08L 51/04* | (2006.01) |
| *F26B 3/08* | (2006.01) |
| *F26B 3/084* | (2006.01) |
| *F26B 21/33* | (2026.01) |
| *F26B 21/35* | (2026.01) |
| *F26B 21/40* | (2026.01) |

(52) U.S. Cl.
CPC ............ *C08F 6/008* (2013.01); *C08F 212/10* (2013.01); *C08F 257/02* (2013.01); *F26B 3/08* (2013.01); *F26B 3/084* (2013.01); *F26B 21/33* (2026.01); *F26B 21/35* (2026.01); *F26B 21/40* (2026.01); *C08L 25/12* (2013.01); *C08L 51/04* (2013.01)

(58) Field of Classification Search
CPC ........ B01D 21/262; F26B 3/084; F26B 21/35; F26B 21/40; F26B 3/08; F26B 21/33; F26B 21/10; F26B 21/14; F26B 21/08; C08L 25/12; C08L 51/04
See application file for complete search history.

(56) References Cited

U.S. PATENT DOCUMENTS

| | | | |
|---|---|---|---|
| 4,181,788 A | 1/1980 | Wingler et al. | |
| 4,224,419 A | 9/1980 | Swoboda et al. | |
| 4,421,875 A | 12/1983 | Mckee et al. | |
| 4,605,699 A | 8/1986 | Mitulla et al. | |
| 4,634,734 A | 1/1987 | Hambrecht et al. | |
| 4,772,743 A | 9/1988 | Schmidt et al. | |
| 4,788,253 A | 11/1988 | Hambrecht et al. | |
| 5,057,593 A | 10/1991 | Marshall et al. | |
| 5,071,946 A | 12/1991 | Schmidt et al. | |
| 5,080,845 A | 1/1992 | Herrmann et al. | |
| 5,100,945 A | 3/1992 | Schmidt et al. | |
| 5,260,375 A | 11/1993 | Lausberg et al. | |
| 5,286,801 A | 2/1994 | Besecke et al. | |
| 5,910,276 A | 6/1999 | Guentherberg et al. | |
| 5,958,316 A | 9/1999 | Guentherberg et al. | |
| 5,994,463 A | 11/1999 | Eckel et al. | |
| 6,140,426 A | 10/2000 | Sarabi et al. | |
| 10,731,031 B2 * | 8/2020 | Michels ................. | C08L 25/12 |

| | | | |
|---|---|---|---|
| 2003/0236350 A1 | 12/2003 | Berzinis et al. | |
| 2004/0255780 A1 | 12/2004 | Konig et al. | |
| 2008/0067137 A1 | 3/2008 | Banister et al. | |
| 2008/0067711 A1 | 3/2008 | Schwemler et al. | |
| 2010/0210789 A1 | 8/2010 | Seidel et al. | |
| 2016/0297957 A1 | 10/2016 | Boeckmann et al. | |
| 2017/0145201 A1 | 5/2017 | Boeckmann et al. | |
| 2018/0355160 A1 | 12/2018 | Michels et al. | |
| 2019/0264021 A1 | 8/2019 | Fischer et al. | |
| 2019/0329220 A1 | 10/2019 | Watabe et al. | |

FOREIGN PATENT DOCUMENTS

| | | | |
|---|---|---|---|
| DE | 2427960 B1 | 6/1975 | |
| DE | 2420358 A1 | 12/1975 | |
| DE | 2724360 A1 | 12/1978 | |
| DE | 2826925 A1 | 1/1980 | |
| DE | 3149046 A1 | 6/1983 | |
| DE | 3149358 A1 | 6/1983 | |
| DE | 3414118 A1 | 10/1985 | |
| DE | 3639904 A1 | 6/1988 | |
| DE | 3840293 A1 | 5/1990 | |
| DE | 3913509 A1 | 10/1990 | |
| DE | 19713509 A1 | 10/1998 | |
| DE | 102007029010 A1 | 2/2008 | |
| EP | 0062901 A2 | 10/1982 | |
| EP | 0258741 A2 | 3/1988 | |
| EP | 443432 A2 | 8/1991 | |
| EP | 0512333 A1 | 11/1992 | |
| EP | 0734825 A1 | 10/1996 | |
| EP | 1415693 A1 | 5/2004 | |
| EP | 3517551 A1 | 7/2019 | |
| GB | 1124911 A | 8/1968 | |
| JP | H01130670 A | 5/1989 | |
| KR | 10-2019-0077540 A | 7/2019 | |
| WO | 2010094416 A1 | 8/2010 | |
| WO | 2012022710 A1 | 2/2012 | |
| WO | 2015078751 A1 | 6/2015 | |
| WO | 2015150223 A1 | 10/2015 | |
| WO | 2017093468 A1 | 6/2017 | |
| WO | 2018060111 A1 | 4/2018 | |
| WO | 2020043690 A1 | 3/2020 | |

OTHER PUBLICATIONS

W. Scholtan, H. Lange: Kolloid Z. u. Z. Polymere 250, S. 782 bis 796 (1972); the relevance of which is discussed on p. 19 of the English-translation of the specification.

* cited by examiner

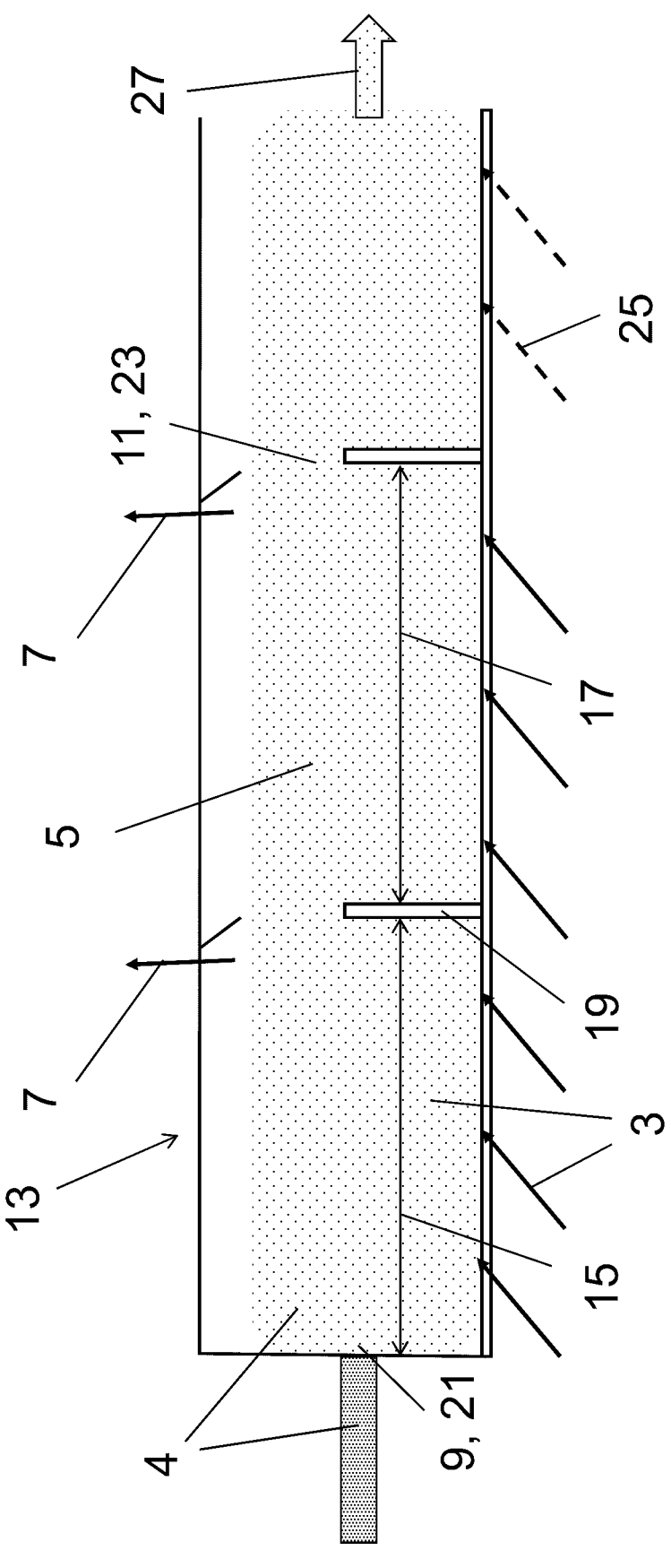

PROCESS FOR PRODUCING A THERMOPLASTIC MOULDING COMPOUND COMPRISING A THERMOPLASTIC COPOLYMER A AND A GRAFT COPOLYMER B

The invention relates to a process for producing a thermoplastic molding compound comprising at least one thermoplastic copolymer A and at least one graft copolymer B that allows the control of continuous drying of graft copolymer B having a potentially variable water content and/or variable mass flow such that a consistent residual moisture content and consistent content of residual monomers is achieved after drying. In addition, the energy input necessary to achieve consistent product properties can be reduced, since this control takes account of fluctuations in the water content and mass flow of the continuously processed graft copolymer B. The molding compounds produced according to the invention also have, in particular, a reduced content of residual monomers. The invention relates also to thermoplastic molding compounds producible by the process of the invention and to molded articles produced from the thermoplastic molding compounds.

Known examples of thermoplastic molding compounds comprising at least one thermoplastic copolymer A and at least one graft copolymer B are based for example on styrene-acrylonitrile (SAN) copolymers or methylstyrene-acrylonitrile copolymers (for example alpha-methylstyrene-acrylonitrile copolymers, AMSAN), acrylonitrile-butadiene-styrene (ABS) or acrylonitrile-butadiene-methylstyrene. These have for many years been used in large amounts as thermoplastic molding compounds for producing molded articles of all kinds and can be modified with a view to improving impact strength by incorporating graft rubbers, for example crosslinked polyacrylate rubbers or grafted polybutadiene rubbers. In principle, such impact-modified molding compounds can be produced by graft polymerization of styrene and acrylonitrile in the presence of a graft rubber, especially polybutadiene rubber, and/or by subsequent mixing of a graft rubber (graft latex) with a separately produced polymeric styrene-acrylonitrile matrix. The spectrum of properties of the molding compounds and of the molded articles produced therefrom can be varied within wide ranges.

It is customary to set the median particle size of the graft rubber at a specific value, since the size of the rubber particles has a significant influence on the physical properties of the subsequent thermoplastic molding compound. This is described for example in WO 2015/078751.

Following the graft polymerization, the graft copolymer (graft rubber) is commonly precipitated by adding a salt solution and/or acid solution as a coagulant, washed, and dried. EP-A 0734825 describes the dewatering and drying of ASA graft copolymers in an extruder.

In addition to advantageous mechanical properties such as high toughness (impact strength, notched impact strength), high elasticity (E modulus), and good processability (thermoplastic flowability, more particularly an appropriate melt flow index, MVR), it is important for thermoplastic molding compounds to have high heat resistance.

Moreover, it is desirable to obtain thermoplastic molding compounds having the lowest possible content of residual monomers and of acrylonitrile and/or styrene in particular. The prior art describes various processes intended to reduce the content of monomers in the polymer. Document DE-102007029010 describes a process for compounding two polymers, for example ABS and PC, using an extruder having degassing zones and employing an inert entraining agent. Document DE-A 3840293 describes a process for removing low-molecular-weight compounds from polymers, in which an inert extraction gas is mixed with the polymer in an extruder.

WO 2010/094416 describes a process for producing a polymer composition, for example PC/ABS blends, having a reduced proportion of volatile compounds, wherein the polymers, which have a certain content of water, are melted in an extruder having a special degassing zone. EP-A 1415 693 describes a process in which a mixture of polymer, residual monomers, oligomers, and solvent is extruded through a plurality of nozzles into a degassing vessel.

The disadvantage of the described processes for reducing the content of residual monomers is that they often require high outlay on equipment, the use of an extraction gas, and renewed melting of the polymer after production.

WO 2017/093468 and WO 2018/060111 relate to the use of a fluid-bed dryer and/or a flow dryer for producing ABS molding compounds and ASA molding compounds respectively, but do not cover the control of the drying process. Polymer drying in a fluidized bed is also mentioned in WO 2020/043690 and US 2003/0236350, but without any reference to appropriate control of a continuous drying process.

US 2008/0067137 describes a device that can be used both for filtering and for drying. During drying a fluidized bed is present that has spatial characteristics which vary depending on the drying gas flow supplied.

EP-A 3517551 discloses a process for drying polymers, in which a residual monomer content that depends on various parameters such as a mass flow of a drying gas and of the polymer to be dried is described but makes no allowance for a changeable water content in the polymer to be dried.

There is a need to provide a simple and inexpensive production process for thermoplastic molding compounds, wherein the molding compounds obtained have good mechanical properties and wherein the dried intermediate product has a consistent moisture content and a consistently low content of residual monomers is ensured.

In addition, the content of residual monomers should be reduced without an additional, costly, apparatus-based degassing extrusion step being necessary. In particular, the total content of residual monomers, in particular residual styrene, i.e. monomeric styrene, for example in an ASA graft copolymer, should be reduced to a value below 500 ppm, preferably below 400 ppm, more preferably below 300 ppm, and the total content of residual acrylonitrile, i.e. monomeric acrylonitrile, for example in an ASA graft copolymer, should be reduced to a value below 100 ppm, preferably below 75 ppm, more preferably below 50 ppm, in each case based on the dry ASA graft copolymer, and the content of residual monomers, in particular residual styrene, i.e. monomeric styrene, in an ABS graft copolymer reduced to a value of ≤2000 ppm, preferably ≤1000 ppm, in each case based on the dry ABS graft copolymer.

The dry graft copolymer, such as the dry graft copolymer B, is understood as meaning in particular the dry mass of the graft copolymer or of the graft copolymer B.

It has been found that particularly advantageous thermoplastic molding compounds are obtained when the drying of the graft copolymer B (graft rubber), after precipitation in particular, takes place in a fluid-bed dryer, also referred to as a fluidized-bed dryer, and when this is controlled in a continuous operating mode such that a water content or residual monomer content in the dried graft copolymer B is constant, irrespective of the water content in the graft copolymer B supplied to the drying process.

It has also been found that rapid and even drying, as can be achieved in a fluid-bed dryer, especially with appropriately controlled temperatures and volume flows in the drying gas, which is for example air or nitrogen, is advantageous for the thermoplastic molding compounds and molded articles produced therefrom.

It was additionally found that the drying of the graft copolymer B of the invention is able to significantly reduce the content of residual monomers, especially the content of acrylonitrile and/or styrene in ASA molding compounds and especially the content of acrylonitrile, 4-vinylcyclohexene, if present, and styrene in ABS molding compounds. The thermoplastic molding compounds produced by the process of the invention are therefore distinguished by a very low content of residual monomers, without an additional degassing extrusion step being necessary. Furthermore, the thermoplastic molding compounds exhibit high consistency over time in their product properties.

In particular, it was found that the content of residual monomers can be significantly reduced when the graft copolymer B, on attaining a water content of 2% by weight, especially on attaining a water content of 1% by weight, especially based on the total graft copolymer B, remains in contact with the drying gas/in the fluidized bed for a further 5 to 40 minutes, particularly at a essentially constant temperature, i.e. step c) of the process of the invention is essentially continued, with the drying gas preferably having an inflow temperature $T_{G,in}$ within a range from 45° C. to 80° C., more preferably from 50° C. to 70° C. In particular, the other properties, in particular mechanical properties, of the thermoplastic molding compound are not adversely affected by this.

In addition, the process of the invention achieves high product consistency and product quality, characterized in particular by a consistent and low residual monomer content and a consistent water content. In particular, this is possible even when the residual moisture content of the dewatered graft copolymer B fluctuates alongside a parallel fluctuation in throughput.

Fluid-bed dryers are apparatuses that can be operated in a batchwise manner or continuously, especially continuously. Fluid-bed dryers are described for example in Krischer/Kröll, Trocknungstechnik [Drying techniques] (volume two, Trockner und Trocknungsverfahren [Dryers and drying processes], Springer Verlag, 1959, pp. 275-282). It is also possible to use fluid-bed dryers that have one or more heat exchangers integrated into the fluidized bed. The use of heat exchangers allows in particular the necessary drying energy to be introduced into the fluid bed.

Such fluid-bed dryers are described for example in D. Gehrmann et al., Trocknungstechnik in der Lebensmittelindustrie [Drying technology in the food industry] (Behr's Verlag Gmbh & Co. KG, 1st edition 2009, chapter 2.5.3, Statische Wirbelschichttrockner [Static fluidized-bed dryers], pp. 143-145). Fluid-bed dryers can be operated with various drying gases such as air or nitrogen.

The invention provides a process for producing a thermoplastic molding compound comprising at least one thermoplastic copolymer A and at least one graft copolymer B, comprising the following steps:
  a) precipitating the at least one graft copolymer B after an emulsion polymerization, by adding a precipitation solution;
  b) dewatering the precipitated graft copolymer B, preferably by centrifugation and/or filtration, affording a dewatered graft copolymer B having a water content of less than or equal to 50% by weight, based in particular on the total dewatered graft copolymer B;
  c) continuously drying the dewatered graft copolymer B, wherein a drying gas and the dewatered graft copolymer B are supplied, the dewatered graft copolymer B is moved by the drying gas and a fluidized bed forms, the drying gas has an inflow temperature $T_{G,in}$ in the range from 50° C. to 160° C., and dried graft copolymer B and an offgas are discharged, wherein
    i a starting temperature $T_{in}$ of the fluidized bed is measured in the inflow of the dewatered graft copolymer B,
    ii. an end temperature $T_{out}$ of the fluidized bed is measured in the outflow of the dried graft copolymer B and/or of the offgas,
    iii. a difference $\Delta T_{meas}$ between the measured end temperature $T_{out}$ and the measured starting temperature $T_{in}$ is calculated and the difference $\Delta T_{meas}$ compared with a nominal value $\Delta T_{nom}$, which is in particular at least 2° C., and
    iv. the end temperature $T_{out}$ is adjusted by
      increasing a mass flow of supplied drying gas and/or the inflow temperature $T_{G,in}$ of the drying gas when the difference $\Delta T_{meas}$ is smaller than the nominal value $\Delta T_{nom}$ or
      decreasing a mass flow of supplied drying gas and/or the inflow temperature $T_{G,in}$ of the drying gas when the difference $\Delta T_{meas}$ IS greater than the nominal value $\Delta T_{nom}$;
  d) optionally mixing together the thermoplastic copolymer A, the dried graft copolymer B, optionally further polymeric component(s) C, and optionally further component(s) K.

The process of the invention with continuous drying of a dewatered graft copolymer B, more particularly a graft copolymer having a variable water content and/or variable mass flow, affords a dried graft copolymer B having a consistent water content and residual monomer content.

A further feature of the thermoplastic molding compounds obtained by the process of the invention is that they have a consistent and low content of residual monomers, a consistent content of the graft copolymer B, and good mechanical properties.

The invention also provides a thermoplastic molding compound obtainable by the process of the invention and a molded article produced from the thermoplastic molding compound.

The graft copolymer B is preferably based on an acrylic ester-styrene-acrylonitrile copolymer or on a polybutadiene. The thermoplastic molding compound is more preferably an ASA molding compound, especially one comprising a graft copolymer B based on an acrylic ester-styrene-acrylonitrile copolymer, or an ABS molding compound, especially one comprising a graft copolymer B based on a polybutadiene.

Thermoplastic molding compounds are for the purposes of the present invention to be understood to mean molding compounds containing preferably at least 10% by weight, preferably at least 60% by weight, more preferably at least 95% by weight, of the thermoplastic copolymer A and graft copolymer B (sum total). Preferably, the thermoplastic molding compound contains exclusively the thermoplastic copolymer A and the graft copolymer B as polymeric components. Thermoplastic molding compounds are for the purposes of the present invention also polymer blends comprising the thermoplastic copolymer A and the graft copolymer B and at least one further polymeric component C, especially a rubber-free thermoplastic resin not composed of vinyl monomers, for example a polycondensate, preferably selected from polycarbonates, polyester carbonates, polyesters, and polyamides.

Likewise suitable are derivatives or variants of SAN polymers, ABS or ASA, such as ones based on alphamethylstyrene or methacrylate or ones that include further comonomers, for example the copolymer known as methyl methacrylate-acrylonitrile-butadiene-styrene (MABS). It is also possible to use mixtures of two or more different styrene copolymers. Also suitable are rubber-modified styrene copolymers that are wholly or partly based on other rubbers, such as ethylene-butadiene rubbers or silicone rubbers.

Preference is also given to blends of the mentioned polymers with polyamides, polybutylene terephthalates and/or polycarbonates.

Particulate rubbers are in particular used as graft copolymer B. Particular preference is given to rubbers having a grafted-on shell of other, generally non-elastomeric, polymers.

One embodiment of the invention consists of a process that employs as graft copolymer B graft rubbers formed in two or more stages in which the elastomeric base stage or graft stage are obtained by polymerization of one or more of the monomers butadiene, isoprene, chloroprene, styrene, alkyl styrene, $C_1$ to $C_{12}$ alkyl acrylate or methacrylate esters and small amounts of other monomers, including crosslinking monomers, and in which the hard graft stages are polymerized from one or more of the monomers styrene, alkyl styrene, acrylonitrile, and methyl methacrylate.

Preference is given to graft copolymer B particles formed from polymers based on butadiene/styrene/acrylonitrile, n-butyl acrylate/styrene/acrylonitrile, butadiene/n-butyl acrylate/styrene/acrylonitrile, n-butyl acrylate/methyl methacrylate, n-butyl acrylate/styrene/methyl methacrylate, butadiene/styrene/acrylonitrile/methyl methacrylate and/or butadiene/n-butyl acrylate/methyl methacrylate/styrene/acrylonitrile. Up to 10% by weight of polar monomers bearing functional groups or crosslinking monomers may be incorporated by polymerization into the core or shell.

The thermoplastic copolymer A is preferably a rubber-free copolymer A. Also preferred as the employed thermoplastic copolymer A are styrene-acrylonitrile (SAN) copolymers, polystyrene, polymethyl methacrylate, polyvinyl chloride or mixtures of these polymers. Preference here is given to SAN polymers, polymethyl methacrylate (PMMA) or mixtures of these polymers.

Also employable as the thermoplastic copolymer A are polycarbonates, polyalkylene terephthalates such as polybutylene terephthalate and polyethylene terephthalate, polyoxymethylene, polymethyl methacrylate, polyphenylene sulfide, polysulfones, polyether sulfones, and polyamides, and mixtures of these thermoplastics.

In all of the thermoplastic copolymers A mentioned, some or all of the styrene can be replaced by alpha-methylstyrene or by ring-alkylated styrenes or by acrylonitrile. Of the last-mentioned thermoplastic copolymers A, preference is given to ones based on alpha-methylstyrene/acrylonitrile and/or styrene/methyl methacrylate.

Preferred examples of the graft copolymer B are polymers of conjugated dienes such as butadiene having an outer graft shell based on a vinylaromatic compound, for example SAN copolymers. Likewise preferred are graft rubbers based on crosslinked polymers of $C_1$ to $C_{12}$ alkyl acrylate esters such as n-butyl acrylate or ethylhexyl acrylate, grafted in one or more stages with polymers based on vinylaromatic compounds such as styrene or SAN copolymers. Also possible are graft rubbers that essentially comprise a copolymer of conjugated dienes and $C_1$ to $C_{12}$ alkyl acrylates, for example a butadiene-n-butyl acrylate copolymer, and one or more outer graft stages of SAN copolymer, polystyrene or PMMA. The production of such graft rubbers by the customary processes, in particular by emulsion or suspension polymerization, is known.

Graft rubbers based on SAN-grafted polybutadiene are described for example in DE 24 27 960 and EP-A 258 741 and ones based on SAN-grafted poly-n-butyl acrylate in DE-AS 12 60 135 and DE-OS 31 49 358. More information on SAN-grafted poly(butadiene/n-butyl acrylate) mixed rubbers can be found in EP-A 62 901.

In the case of the graft rubbers mentioned in the last paragraph, copolymers of styrene and acrylonitrile are used as the thermoplastic copolymer A. They are known, and in some cases also commercially available, and generally have a viscosity number VN (determined according to DIN 53 726 at 25° C., 0.5% by weight in dimethylformamide) of 40 ml/g to 160 ml/g, corresponding to an average molar weight Mw of about 40 000 g/mol to 2 000 000 g/mol.

The thermoplastic copolymer A is preferably produced by continuous bulk polymerization or solution polymerization, with the thermoplastic copolymer A separated from the liquid phase in an additional work step. Details of the manufacturing processes are described for example in Kunststoffhandbuch [Plastics handbook], eds. R. Vieweg and G. Daumiller, vol. V "Polystyrol" [Polystyrene], Carl-Hanser-Verlag, Munich, 1969, pp. 118-124.

If the graft copolymer B is a SAN-grafted polybutadiene, incorporation of the SAN results in a molding compound known as ABS (acrylonitrile/butadiene/styrene). If a SAN-grafted alkyl acrylate is used as graft copolymer B, what are known as ASA (acrylonitrile/styrene/acrylate) molding compounds are formed.

In one embodiment graft copolymers B based on polydienes and/or polyalkyl acrylates and also SAN and/or PMMA are used that are formed from two or more graft stages. Examples of such multistage graft particles are particles comprising a polydiene and/or polyalkyl acrylate as the core, a polystyrene or SAN polymer as the first shell, and another SAN polymer having an altered styrene:acrylonitrile weight ratio as the second shell or else particles composed of a core of polystyrene, polymethyl methacrylate or SAN polymer, a first shell of polydiene and/or polyalkyl acrylate, and a second shell of polystyrene, polymethyl methacrylate or SAN polymer. Further examples are graft rubbers composed of a polydiene core, one or more polyalkyl acrylate shells, and one or more polymer shells composed of polystyrene, polymethyl methacrylate or SAN polymer or analogously structured graft rubbers having an acrylate core and polydiene shells.

Also possible are graft copolymers B having a multistage core-shell structure composed of crosslinked alkyl acrylate, styrene, and methyl methacrylate and an outer shell composed of PMMA. Such multistage graft rubbers are described for example in DE-OS 31 49 046. Graft rubbers based on n-butyl acrylate/styrene/methyl methacrylate having a shell composed of PMMA are described for example in EP-A 512 333, although graft rubbers having any other structure corresponding to the prior art are also possible. Such rubbers are used as an impact-modifying component for polyvinyl chloride and preferably for impact-modified PMMA.

Employed as the thermoplastic copolymer A are preferably again the mentioned SAN copolymers and/or PMMA. When the graft copolymer B is a multishell core/shell polymer based on n-butyl acrylate/methyl methacrylate and the thermoplastic copolymer A is PMMA, impact-resistant PMMA is obtained.

The average diameter of the particulate graft copolymer B is preferably 0.05 μm to 20 μm. When the generally known graft rubbers are small in diameter, the average diameter is preferably from 80 nm to 300 nm and more preferably from 90 nm to 200 nm.

In the case of large-particle graft rubbers, the average diameter is preferably 300 nm to 900 nm, more preferably 350 nm to 750 nm, and especially 350 nm to 650 nm. In this embodiment too, the preferred thermoplastic copolymers A are the mentioned SAN copolymers, polystyrene and/or PMMA.

Component C constitutes further polymers, especially thermoplastic polymers. All polymers mentioned for the thermoplastic copolymer A are suitable for component C. Component C and the thermoplastic copolymer A generally differ in the monomers used.

When the monomers from which component C and the thermoplastic copolymer A are formed are identical, component C and the thermoplastic copolymer A generally differ in the proportions of the monomers, for example component C and the thermoplastic copolymer A may be styrene-acrylonitrile copolymers that differ in their styrene:acrylonitrile ratio. Where the proportions of the monomers are identical too, component C and the thermoplastic copolymer A differ in having different average molar weights Mw (A) and Mw (C), measurable for example as different viscosity numbers VN (A) and VN (C).

As monomers for the production of component C, besides the monomers styrene, acrylonitrile, methyl methacrylate, and vinyl chloride mentioned inter alia for the thermoplastic copolymer A, it is also possible to use the following compounds as key constituents: alpha-methylstyrene and $C_1$ to $C_8$ ring-alkylated styrenes or alpha-methyl styrenes, meth-acrylonitrile, $C_1$ to $C_{12}$ alkyl acrylate and methacrylate esters, maleic acid, maleic anhydride, maleimides, vinyl ethers, and vinylformamide.

Examples of component C include polymers based on alpha-methylstyrene/acrylonitrile and methyl methacrylate/alkyl acrylate and also copolymers of alkyl acrylate or methacrylate esters and styrene or acrylonitrile or styrene and acrylonitrile.

Other preferred components C are styrene-acrylonitrile copolymers having monomer proportions different from the thermoplastic copolymer A or having different average molar weights Mw. Mw is determined according to standard methods.

Suitable polycarbonates can be obtained for example by interfacial polycondensation in accordance with the method of DE-B-1 300 266 or by reacting diphenyl carbonate with bisphenols according to the method of DE-A-14 95 730. A preferred bisphenol is 2,2-di(4-hydroxyphenyl)propane, commonly referred to as bisphenol A. Instead of bisphenol A, other aromatic dihydroxy compounds may also be used, especially 2,2-di(4-hydroxyphenyl)pentane, 2,6-dihy-droxynaphthalene, 4,4'-dihydroxydiphenyl sulfone, 4,4'-di-hydroxydiphenyl ether, 4,4'-dihydroxydiphenyl sulfite, 4,4'-dihydroxydiphenylmethane, 1,1-di-(4-hydroxyphenyl) ethane or 4,4-dihydroxybiphenyl and mixtures of the aforementioned dihydroxy compounds.

Particularly preferred polycarbonates are ones based on bisphenol A or bisphenol A together with up to 30 mol % of the aforementioned aromatic dihydroxy compounds. The relative viscosity of these polycarbonates is generally in the range from 1.1 to 1.5, especially from 1.28 to 1.4 (measured at 25° C. in a 0.5% by weight solution in dichloromethane).

Polybutylene terephthalate and polyethylene terephtha-late are preferably produced by condensation of terephthalic acid or esters thereof with butanediol or ethanediol under catalysis. The condensation is advantageously carried out in two stages (precondensation and polycondensation). Details can be found for example in Ullmann's Encyclopädie der Technischen Chemie [Ullmann's Encyclopedia of Technical Chemistry], 4th edition, volume 19, pp. 61-88.

Preferred polyamides are ones having an aliphatic, semicrystalline or partially aromatic or else amorphous structure of any kind and blends thereof. Thermoplastic polyurethanes (TPUs) are usually produced by reacting organic, preferably aromatic diisocyanates, for example diphenylmethane 4,4'-diisocyanate, with polyhydroxyl com-pounds, which are preferably essentially linear, such as polyetherols or polyesterols, for example polyalkylene gly-col polyadipates, and diols acting as chain extenders, for example butane-1,4-diol, in the presence of catalysts such as tertiary amines (for example triethylamine) or organic metal compounds. The ratio of the NCO groups in the diisocya-nates to the sum total of the OH groups (from the polyhy-droxyl compounds and the chain-extending diols) is prefer-ably about 1 to 1. The TPUs are preferably produced by what is known as the belt process. Details on the TPUs can be found for example in EP-A 443 432.

In addition, component C may consist essentially of copolymers of $C_2$ to $C_9$ alkenes, such as ethylene, propene and butene, with vinylaromatics, polar comonomers, such as acrylic acid and methacrylic acid, $C_1$ to $C_{12}$ alkyl acrylate and methacrylate esters, and other mono- or polyfunctional ethylenically unsaturated acids such as maleic acid, maleic anhydride, fumaric acid, itaconic acid, and esters thereof, especially glycidyl esters, esters with $C_1$ to $C_9$ alkanols and esters with aryl-substituted $C_1$ to $C_9$ alkanols, carbon mon-oxide, non-aromatic vinyl compounds, such as vinyl acetate, vinyl propionate, and vinyl alkyl ethers, basic monomers, such as hydroxyethyl acrylate, dimethylaminoethyl acrylate, vinylcarbazole, vinylaniline, vinylcaprolactam, vinylpyr-rolidone, vinylimidazole, and vinylformamide, acrylonitrile, and methacrylonitrile, which are produced in a generally known manner.

In one embodiment, a component C is used that can be produced from 40% by weight to 75% by weight of ethyl-ene, 5% by weight to 20% by weight of carbon monoxide, and 20% by weight to 40% by weight of n-butyl acrylate, or a component C that can be produced from 50% by weight to 98.9% by weight of ethylene, 1% by weight to 45% by weight of n-butyl acrylate, and 0.1% by weight to 20% by weight of one or more compounds selected from the group consisting of acrylic acid, methacrylic acid, and maleic anhydride. Production in the last-mentioned embodiments is usually by free-radical polymerization and is described in documents U.S. Pat. Nos. 2,897,183 and 5,057,593.

In addition to the thermoplastic copolymer A, graft copo-lymer B, and component C, the thermoplastic molding compounds produced by the process of the invention may, as further components K, comprise additives and auxiliaries, for example waxes, plasticizers, lubricants and demolding agents, pigments, dyes, matting agents, flame retardants, antioxidants, stabilizers against the effects of light and thermal damage, fibrous and pulverulent fillers and reinforc-ers, and antistats in the amounts customary for these agents.

The components K may be in pure form as solids, liquids or gases or they may be employed already as a mixture of the pure substances with one another. They may likewise be used in a formulation that facilitates dosing, such as a solution, or as a dispersion (emulsion or suspension). Formulation as a masterbatch, i.e. as a concentrated mixture with a thermoplastic polymer compatible with the extruder contents, is also suitable and in some cases preferable.

In a first preferred embodiment, the thermoplastic molding compound comprises at least one rubber-modified styrene-acrylonitrile (SAN) copolymer (as thermoplastic copolymer A) with at least one acrylic ester-styrene-acrylonitrile (ASA) rubber (as graft copolymer B), having in particular a bimodal particle size distribution and a median particle size of 80 nm to 600 nm, commonly also 200 nm to 600 nm, and a SAN matrix having an acrylonitrile (AN) content of 25% by weight to 35% by weight, preferably 27% by weight to 33% by weight.

In the first preferred embodiment, the thermoplastic molding compound more preferably comprises:

A: 5% to 90% by weight at least of the thermoplastic copolymer A produced from:

A1: 50% to 95% by weight, based on copolymer A, of a monomer A1 selected from styrene, α-methylstyrene or mixtures of styrene and at least one further monomer selected from α-methylstyrene, p-methylstyrene, and $C_1$ to $C_8$ alkyl (meth)acrylate, A2: 5% to 50% by weight, based on copolymer A, of a monomer A2 selected from acrylonitrile or mixtures of acrylonitrile and at least one further monomer selected from methacrylonitrile, acrylamide, vinyl methyl ether, anhydrides of unsaturated carboxylic acids, and imides of unsaturated carboxylic acids, B: 5% to 70% by weight at least of the graft copolymer B, comprising:

B1: 50% to 90% by weight, based on the graft copolymer B, of at least one graft base B1 obtained by emulsion polymerization of:

B11: 70% to 99.9% by weight, based on the graft base B1, of at least one $C_1$-$C_8$ alkyl (meth)acrylate, as monomer B11;

B12: 0.1% to 10% by weight, based on the graft base B1, of at least one polyfunctional crosslinking monomer B12;

B13: 0% to 29.5% by weight, preferably 0% to 20% by weight, more preferably 0% to 10% by weight, based on the graft base B1, of at least one further monomer B13 selected from styrene, α-methylstyrene, $C_1$-$C_4$ alkyl styrene, acrylonitrile, methacrylonitrile, isoprene, butadiene, chloroprene, methyl methacrylate, alkylene glycol di(meth)acrylate, and vinyl methyl ether;

where the sum B11+B12+B13 comes to exactly 100% by weight; and

B2: 10% to 50% by weight, based on the graft copolymer B, of at least one graft shell B2, preferably one to three graft shells B2, obtained by emulsion polymerization in the presence of the at least one graft base B1 of:

B21: 50% to 100% by weight, based on the graft shell B2, of a monomer B21 selected from styrene, α-methylstyrene or mixtures of styrene and at least one further monomer selected from α-methylstyrene, p-methylstyrene, and $C_1$ to $C_4$ alkyl (meth)acrylate;

B22: 0% to 50% by weight, based on the graft shell B2, of a monomer B22 selected from acrylonitrile or mixtures of acrylonitrile and at least one further monomer selected from methacrylonitrile, acrylamide, vinyl methyl ether, anhydrides of unsaturated carboxylic acids, and imides of unsaturated carboxylic acids;

wherein the sum total of graft base B1 and graft shell B2 comes to exactly 100% by weight; and C: 0% to 90% by weight of at least one further polymeric component C, and K: 0% to 40% by weight of at least one further component K selected from additives and auxiliaries.

The expressions (meth)acrylic and (meth)acrylate, for example in the terms (meth)acrylic acid or $C_1$-$C_8$ alkyl (meth)acrylate ester, encompass for the purposes of the present invention the corresponding acrylic and/or methacrylic compounds.

In the first preferred embodiment, the thermoplastic copolymer A is preferably produced from (or consists of):

50% to 95% by weight, preferably 60% to 90% by weight, more preferably 60% to 85% by weight, based on copolymer A, of monomer A1 selected from styrene, α-methylstyrene or mixtures of styrene and α-methylstyrene, and 5% to 50% by weight, preferably 10% to 40% by weight, more preferably 15% to 40% by weight, based on copolymer A, of a monomer A2 selected from acrylonitrile or mixtures of acrylonitrile and methacrylonitrile.

In the first preferred embodiment, the graft copolymer B contains preferably 10% to 50% by weight, more preferably 20% to 50% by weight, particularly preferably 25% to 45% by weight, based on the graft copolymer B, of at least one graft shell B2 obtained by emulsion polymerization of:

B21: 50% to 95% by weight, preferably 65% to 80% by weight, more preferably 70% to 80% by weight, based on the graft shell B2, of a monomer B21 selected from styrene, α-methylstyrene or mixtures of styrene and at least one further monomer selected from α-methylstyrene, p-methylstyrene, and $C_1$-$C_4$ alkyl (meth)acrylate (for example methyl methacrylate, ethyl methacrylate), preferably selected from styrene, α-methylstyrene or mixtures of styrene with α-methylstyrene or methyl methacrylate; and B22: 5% to 50% by weight, preferably 20% to 35% by weight, more preferably 20% to 30% by weight, based on the graft shell B2, of a monomer B22 selected from acrylonitrile or mixtures of acrylonitrile and at least one further monomer selected from methacrylonitrile, acrylamide, vinyl methyl ether, anhydrides of unsaturated carboxylic acids (for example maleic anhydride, phthalic anhydride), and imides of unsaturated carboxylic acids (for example N-substituted maleimides such as N-cyclohexylmaleimide and N-phenylmaleimide), preferably selected from acrylonitrile or mixtures of acrylonitrile and methacrylonitrile;

where the sum B21+B22 comes to exactly 100% by weight.

In the first preferred embodiment, the graft copolymer B consists preferably of the graft base B1 as described above, preferably of a crosslinked polybutyl acrylate rubber, and just one graft shell B2 obtained by emulsion polymerization of the monomers B21 and B22 as described, and of styrene and acrylonitrile in particular, in the presence of the graft base B1 (one-stage graft shell B2). In addition, the graft copolymer B consists preferably of the graft base B1 as described above, preferably of a crosslinked polybutyl acrylate rubber, and two graft shells B2' and B2", where B2' is obtained by emulsion polymerization of the monomer B21 as described, and of styrene in particular, in the presence of the graft base B1 and where the graft shell B2″ is obtained by subsequent emulsion polymerization of the monomers B21 and B22 as described, and of styrene and acrylonitrile in particular, in the presence of the graft base B1 grafted with B2′ (two-stage graft shell B2).

The at least one graft base B1 is particularly preferably obtained by emulsion polymerization of:

B11: preferably 87% to 99.5% by weight, based on the graft base B1, of at least $C_4$-$C_8$ alkyl (meth)acrylate, particularly preferably n-butyl acrylate and/or 2-ethylhexyl acrylate, more preferably exclusively n-butyl acrylate;

B12: 0.5% to 5% by weight, preferably 0.5% to 3% by weight, more preferably 1% to 2.5% by weight, based on the graft base B1, of at least one polyfunctional crosslinking monomer B12; preferably selected from allyl (meth)acrylate, divinylbenzene, diallyl maleate, diallyl fumarate, diallyl phthalate, triallyl cyanurate, triallyl isocyanurate, and dicyclopentadienyl acrylate (DCPA), particularly preferably allyl (meth)acrylate and/or dicyclopentadienyl acrylate (DCPA);

B13: 0% to 29.9% by weight, preferably 0% to 10% by weight, more preferably 0.5% to 10% by weight, based on the graft base B1, of at least one further copolymerizable monoethylenically unsaturated monomer B13 selected from styrene, α-methylstyrene, $C_1$-$C_4$ alkyl styrene, acrylonitrile, methacrylonitrile, isoprene, butadiene, chloroprene, methyl methacrylate, alkylene glycol di(meth)acrylate, and vinyl methyl ether;

where the sum B11+B12+B13 comes to exactly 100% by weight.

The preferred monomers B11 for producing the graft base B1 are alkyl acrylates and/or alkyl methacrylates having 1 to 8, preferably 4 to 8, carbon atoms in the alkyl radical. The monomer B11 is particularly preferably n-butyl acrylate and/or 2-ethylhexyl acrylate, more preferably n-butyl acrylate. The alkyl acrylates mentioned are preferably used as the sole monomers B11.

In addition, the at least one graft base B1 may be obtained by emulsion polymerization of:

B11: 90% to 99.9% by weight, preferably 97% to 99.5% by weight, based on the graft base B1, of at least one $C_1$-$C_8$ alkyl (meth)acrylate, preferably n-butyl acrylate, B12: 0.1% to 10% by weight, preferably 0.5% to 3% by weight, more preferably 1% to 2.5% by weight, based on the graft base B1, of at least one polyfunctional crosslinking monomer B12 selected from allyl (meth) acrylate, divinylbenzene, diallyl maleate, diallyl fumarate, diallyl phthalate, and dicyclopentadienyl acrylate (DCPA), particularly preferably allyl (meth) acrylate and/or dicyclopentadienyl acrylate (DCPA);

where the sum B11+B12 comes to exactly 100% by weight.

The graft base B1, consisting of the monomers B11, B12, and optionally B13, and the production thereof is known and described in the literature, for example in DE-A 28 26 925, DE-A 31 49 358 and DE-A 34 14 118.

As well as the thermoplastic copolymer A and the graft copolymer B, the thermoplastic molding compounds may comprise, particularly in the first preferred embodiment, the further component C.

In one embodiment, the thermoplastic molding compound is an ASA blend containing 1% to 90% by weight, preferably 10% to 85% by weight, more preferably 20% to 50% by weight, particularly preferably 1% to 30% by weight, based on the total thermoplastic molding compound, of at least one rubber-free further polymeric component C not formed from vinyl monomers, preferably selected from polycarbonates, polyester carbonates, and polyamides. The thermoplastic molding compound is preferably a PC/ASA blend containing 1% to 90% by weight, preferably 10% to 85% by weight, more preferably 20% to 50% by weight, commonly 10% to 40% by weight, based on the total thermoplastic molding compound, of at least one aromatic polycarbonate and/or aromatic polyester carbonate as further polymeric component C.

In particular, the term "polycarbonates" encompasses the esters of carbonic acid (condensation products of aromatic diphenols with carboxylic acid halides, especially phosgene) and aromatic polyester carbonates (condensation products of diphenols with aromatic dicarboxylic acid halides).

It is also possible to use mixed condensation products as aromatic polyester carbonates, wherein the proportion of carbonate groups may be up to 50 mol %, especially up to 80 mol %, more preferably up to 100 mol %, based on the sum total of the carbonate groups and ester groups. Ester and carbonate groups can occur in the condensation product in the form of blocks or in a random distribution.

In a preferred embodiment, the thermoplastic molding compound contains 1% to 90% by weight, preferably 10% to 85% by weight, particularly preferably 10% to 40% by weight, of at least one aromatic polycarbonate as component C formed from 2,2-bis(4-hydroxyphenyl)propane (bisphenol A) and phosgene, with polycarbonates produced from precursors or synthetic building blocks of bisphenol A and phosgene also included.

In a second preferred embodiment, the thermoplastic molding compound comprises:

A: 5% to 95% by weight at least of the thermoplastic copolymer A produced from:

A1: 50% to 95% by weight, based on copolymer A, of a monomer A1 selected from styrene, α-methylstyrene or mixtures of styrene and at least one further monomer selected from α-methylstyrene, p-methylstyrene, and $C_1$-$C_8$ alkyl (meth)acrylate esters, A2: 5% to 50% by weight, based on copolymer A, of a monomer A2 selected from acrylonitrile or mixtures of acrylonitrile and at least one further monomer selected from methacrylonitrile, anhydrides of unsaturated carboxylic acids, and imides of unsaturated carboxylic acids, B: 5% to 95% by weight at least of the graft copolymer B, comprising:

B1: 40% to 85% by weight, based on the graft copolymer B, of at least one graft base B1 obtained by emulsion polymerization of:

B11: 50% to 100% by weight, based on the graft substrate B1, of butadiene,

B12: 0% to 50% by weight, based on the graft base B1, of at least one further monomer B12 selected from styrene, α-methylstyrene, acrylonitrile, methacrylonitrile, isoprene, chloroprene, $C_1$-$C_4$ alkyl styrene, $C_1$-$C_8$ alkyl (meth)acrylate esters, alkylene glycol di(meth)acrylate, and divinylbenzene;

where the sum B11+B12 comes to exactly 100% by weight; and

B2: 15% to 60% by weight, based on the graft copolymer B, of a graft shell B2 obtained by emulsion polymerization in the presence of the at least one graft base B1 of:

B21: 50% to 95% by weight, based on the graft shell B2, of a monomer B21 selected from styrene or mixtures of styrene and at least one further monomer selected from α-methylstyrene, p-methylstyrene, and $C_1$-$C_8$ alkyl (meth)acrylate esters, B22: 5% to 50% by weight, based on the graft shell B2, of a monomer B22 selected from acrylonitrile or mixtures of acrylonitrile and at least one further monomer selected from methacrylonitrile, anhydrides of unsaturated carboxylic acids, and imides of unsaturated carboxylic acids;

wherein the sum total of graft base B1 and graft shell B2 comes to exactly 100% by weight; and K: 0% to 90% by weight of at least one further component K.

In the second preferred embodiment, the thermoplastic copolymer A is preferably produced from (or consists of):

A1: 50% to 95% by weight, preferably 65% to 80% by weight, more preferably 69% to 80% by weight, particularly preferably 71% to 80% by weight, based on copolymer A, of monomer A1 selected from styrene, α-methylstyrene or mixtures of styrene and α-methylstyrene, and A2: 5% to 50% by weight, preferably 20% to 35% by weight, more preferably 20% to 31% by weight, particularly preferably 20% to 29% by weight, based on copolymer A, of monomer A2 selected from acrylonitrile or mixtures of acrylonitrile and methacrylonitrile.

In the second preferred embodiment, the at least one graft base B1 is preferably obtained by emulsion polymerization of:

B11: 50% to 100% by weight, preferably 80% to 100% by weight, based on the graft base B1, of butadiene, B12: 0% to 50% by weight, preferably 0% to 20% by weight, more preferably 0% to 10% by weight, based on the graft base B1, of at least one further monomer B12 selected from styrene and acrylonitrile;

where the sum B11+B12 comes to exactly 100% by weight.

The at least one graft base B1 is preferably obtained by emulsion polymerization of butadiene alone. In a further embodiment, the at least one graft base B1 is obtained by emulsion polymerization of:

B11: 50% to 99% by weight, preferably 80% to 95% by weight, based on the graft base B1, of butadiene, B12: 1% to 50% by weight, preferably 5% to 20% by weight, more preferably 5% to 10% by weight, based on the graft base B1, of at least one further monomer B12 selected from styrene and acrylonitrile;

where the sum B11+B12 comes to exactly 100% by weight.

The monomer B21 is preferably styrene or mixtures of styrene and at least one further monomer selected from α-methylstyrene, methyl methacrylate, ethyl methacrylate, n-butyl acrylate, and t-butyl acrylate, more preferably styrene or mixtures of styrene and at least one further monomer selected from α-methylstyrene and methyl methacrylate.

The monomer B22 is preferably acrylonitrile or mixtures of acrylonitrile and at least one further monomer selected from methacrylonitrile, maleic anhydride, N-cyclohexylmaleimide, and N-phenylmaleimide, more preferably acrylonitrile or mixtures of acrylonitrile and at least one further monomer selected from methacrylonitrile and maleic anhydride.

In a particularly preferred embodiment, the monomer B21 is styrene and the monomer B22 is acrylonitrile.

More preferably, the graft base B1 has a median particle diameter $d_{50}$ in the range from 100 nm to 1000 nm. In addition, the graft base B1 preferably has a gel content in the range from 30% to 95% by weight. The median particle diameter $d_{50}$ is typically determined by ultracentrifuge measurement, as described for example in W. Scholtan, H. Lange (Kolloid Z. u. Z. Polymere 250, pp. 782 to 796 (1972)). The stated values for the gel content relate to the determination by the wire cage method in toluene, as described for example in Houben-Weyl (Methoden der Organischen Chemie [Methods of Organic Chemistry], Makromolekulare Stoffe [Macromolecular substances], part 1, p. 307 (1961), Thieme Verlag Stuttgart).

Methods for producing the at least one graft base B1 are described for example in Houben-Weyl, Methoden der Organischen Chemie [Methods of Organic Chemistry], Makromolekulare Stoffe [Macromolecular Substances], part 1, p. 339 (1961), Thieme Verlag Stuttgart.

In a preferred embodiment, the process of the invention comprises the production of at least two different graft copolymers B starting from at least two different graft bases B1, the graft bases B1 differing in their median particle diameter $d_{50}$.

Further details on agglomeration can be found in WO 2012/022710 A1. Emulsifiers, initiators and molecular weight regulators, bases, acids, and salts can be used, as described in WO 2012/022710 A1.

In the second preferred embodiment, the thermoplastic molding compound is more preferably an ABS blend containing 1% to 90% by weight, preferably 10% to 87.5% by weight, more preferably 20% to 50% by weight, based on the total thermoplastic molding compound, of at least one rubber-free thermoplastic resin not formed from vinyl monomers, preferably selected from polycarbonates and polyamides.

In the first and the second preferred embodiment, the thermoplastic copolymer A is a thermoplastic copolymer A containing less than or equal to 35% by weight, based on the total copolymer A, of acrylonitrile.

More preferably, monomer A1 is styrene or α-methylstyrene, and monomer A2 is acrylonitrile. In a further preferred embodiment, monomer A1 is a mixture of styrene and α-methylstyrene, and monomer A2 is acrylonitrile. Preferably, the described monomer mixture A1 contains at least 10% by weight, preferably at least 50% by weight and more preferably at least 90% by weight, based on the total monomer A1, of styrene.

The thermoplastic copolymer A preferably has average molecular weights Mw in the range from 20 000 to 200 000 g/mol. Preferably, the thermoplastic copolymer A has intrinsic viscosities [η] in the range from 20 to 110 ml/g (measured in dimethylformamide at 25° C.). The thermoplastic copolymer A preferably has a viscosity number (determined in accordance with DIN 53726:1983-09) in the range from 50 to 100 $cm^3/g$, preferably from 55 to 85 $cm^3/g$.

Details on the production of the thermoplastic copolymer A are also described in DE-A 24 20 358 and DE-A 27 24 360. Likewise suitable thermoplastic copolymers A are also described in DE-A 1 971 3509.

The thermoplastic copolymers can be produced either by purely thermal initiation or by adding initiators, especially free-radical initiators, for example peroxides. Suitable thermoplastic copolymers A can preferably be produced by bulk or solution polymerization.

The monomers used for the emulsion polymerization of the graft copolymer B are preferably mixtures of styrene and acrylonitrile in a weight ratio of from 95:5 to 50:50, more preferably in a weight ratio of from 80:20 to 65:35.

It is additionally possible to use molecular weight regulators in the production of the graft base B1 and/or in the emulsion polymerization of the at least one graft copolymer B, preferably in amounts of from 0.01% to 2% by weight, more preferably in amounts of from 0.05% to 1% by weight (in each case based on the total amount of monomer in the emulsion polymerization). Examples of suitable molecular weight regulators are alkyl mercaptans, such as n-dodecyl mercaptan or t-dodecyl mercaptan, α-methylstyrene dimer, and terpinols.

Any desired initiators may be used as initiators in the production of the graft base B1 and/or in the emulsion polymerization of the at least one graft copolymer B. Preference is given to using as initiator at least one organic and/or inorganic peroxide compound (containing at least one peroxide group R—O—O—H and/or R—O—O—R). In particular, inorganic peroxide salts such as ammonium, sodium or potassium peroxodisulfate (persulfate), perphosphate or perborate, are used. Particular preference is given to sodium persulfate and potassium persulfate.

In a preferred embodiment, an inorganic peroxide salt, especially an inorganic peroxodisulfate salt, preferably sodium peroxodisulfate and/or potassium peroxodisulfate, is used for the emulsion polymerization of the graft copolymer B.

The emulsifiers used for producing the graft base B1 and/or for the emulsion polymerization for producing the at least one graft copolymer B can typically be customary anionic emulsifiers. The employed emulsifiers are preferably alkyl sulfates, alkyl sulfonates, arylalkyl sulfonates, soaps of saturated or unsaturated fatty acids and alkaline disproportionated or hydrogenated abietic or tall oil acids or mixtures thereof. Preference is given to using emulsifiers having carboxyl groups (for example salts of $C_{10}$-$C_{18}$ fatty acids, disproportionated abietic acid, emulsifiers according to DE-OS 36 39 904 and DE-OS 39 13 509).

It is also possible to use salts, acids, and bases for the emulsion polymerization of the graft base B1, for example sulfuric acid, phosphoric acid, solutions of sodium hydroxide, potassium hydroxide, sodium and potassium salts of sulfates and phosphates, and tetrasodium pyrophosphate in particular.

For the production of the graft copolymer B, suitable buffer substances are typically used, for example sodium carbonate and sodium bicarbonate. Suitable emulsifiers, buffer substances, and initiators are also described in WO 2015/150223 A1 and WO 2015/078751 A1.

The polymerization temperature for the emulsion polymerization of the graft copolymer B is generally 25° C. to 160° C., preferably 40° C. to 90° C. Suitable emulsifiers are stated above. The usual temperature control, for example isothermal, can be employed here;

however, the graft polymerization is preferably carried out such that the temperature difference between the start and end of the reaction is not more than 20° C., preferably not more than 15° C., and more preferably not more than 5° C.

The graft copolymer B is according to the invention produced by emulsion polymerization. Those skilled in the art are familiar with standard embodiments of emulsion polymerization in batch operation or in continuous operation.

More particularly, the monomers of the graft shell B2, i.e. the monomers B21 and B22, are continuously added—either separately or as a mixture of monomers—to the graft base B2 in the given amounts and ratios and polymerized. The monomers are here typically added to the graft base B1 in a manner known to those skilled in the art.

The necessary or expedient additives, for example antioxidants, UV stabilizers, peroxide destroyers, antistats, lubricants, demolding agents, flame retardants, pigments, fillers or reinforcers (glass fibers, carbon fibers, etc.), colorants, can be added to the molding compounds of the invention as component K during production, processing, further processing, and final shaping.

To protect the graft copolymers B from thermal damage during processing and to be able to carry out processing reliably and safely, it is helpful to add antioxidants, for example one or more phenolic antioxidants, and any other substances that increase the thermal stability of the graft copolymers, to the graft copolymers B in the form of one or more emulsions or dispersions and mix by stirring.

It is also possible to employ as further components K particulate mineral fillers, for example amorphous silica, carbonates such as magnesium carbonate, calcium carbonate (chalk), powdered quartz, mica, a wide range of silicates such as clays, muscovite, biotite, suzorite, tin maletite, talc, chlorite, phlogopite, feldspar, calcium silicates such as wollastonite, or kaolin, especially calcined kaolin. It is also possible to employ as a further component K fibrous fillers such as carbon fibers, potassium titanate whiskers, aramid fibers or glass fibers. Common additives, for ASA molding compounds for example, are described in WO 2015/150223.

The process of the invention for producing the thermoplastic molding compound comprises in particular the following steps:

Step a)

Step a) of the invention comprises precipitating the at least one graft copolymer B after the emulsion polymerization by adding a precipitation solution, especially one comprising at least one salt.

In a preferred embodiment, step a) of the invention comprises the precipitation of different graft copolymers B separately or together by adding the precipitation solution, especially one comprising at least one salt. For this, the graft copolymers B are employed in their latex form after the emulsion polymerization. The precipitated graft copolymers B are processed further separately or together, as described in steps b) to d), if performed.

The precipitation solution used for precipitating the at least one graft copolymer B after the emulsion polymerization may in particular be aqueous salt solutions, for example aqueous solutions of magnesium sulfate, kieserite, pentahydrite, hexahydrite, epsomite (Epsom salt), calcium chloride, sodium chloride or mixtures thereof.

Preferably, it is also possible to use mixtures of aqueous salt solutions and acids (for example sulfuric acid, acetic acid) as the precipitation solution. Preferred salts here are magnesium sulfate, kieserite ($Mg[SO_4]\cdot H_2O$), pentahydrite ($Mg[SO_4]\cdot 5H_2O$), hexahydrite ($Mg[SO_4]\cdot 6H_2O$), and epsomite ($Mg[SO_4]\cdot 7H_2O$, Epsom salt); preferred acids are sulfuric acid, acetic acid, and mixtures thereof. More preferably, the at least one graft copolymer B is precipitated in step a) by the action of an aqueous salt solution, the salt preferably being selected from magnesium sulfate, kieserite, pentahydrite, hexahydrite, and epsomite (Epsom salt).

The precipitation solutions typically have a concentration of salt or of salt and acid in the range from 0.3% to 10% by weight based on the precipitation solution. The precipitation of at least one graft copolymer B in step a) may be effected in a single stage, or in two or more stages through the addition of two or more precipitation solutions, which may be the same or different.

The precipitation of the at least one graft copolymer B can preferably be effected by continuous or batchwise addition of the precipitation solution or by addition of the graft copolymer latex to the precipitation solution. In the case of continuous addition, the precipitation typically takes place in one or more continuously operated stirred tanks, for example continuous stirred-tank reactors.

In a particularly preferred embodiment, an aqueous magnesium sulfate solution is metered into the graft copolymer B (latex) continuously and simultaneously, in one or more stages.

The precipitation can be carried out in a temperature range from 20° C. to 150° C.; preferably from 40° C. to 120° C., more preferably from 50° C. to 100° C.

After adding the precipitation solution, the mixture can typically be transferred under pressure to a sintered vessel at 85° C. to 150° C.

After the precipitation, the grafted particles may agglomerate into larger particles, wherein the agglomerates of the graft copolymer B, which are in particular supplied to the fluidized bed, may for example have a particle diameter $d_{50}$ within a range from 50 µm to 4000 µm, more preferably from 100 µm to 3000 µm.

Step b)

Step b) of the invention comprises the—in particular mechanical—dewatering of the precipitated graft copolymer B, preferably by centrifugation and/or filtration, affording a dewatered graft copolymer B having a water content of less than or equal to 50% by weight.

The water content (referred to also as residual moisture) typically indicates the proportion of water in percent by weight based on the moist graft copolymer B, i.e. graft copolymer B plus total water content. In particular, the water content is determined with the aid of suitable analysis equipment (for example drying scales), the sample being dried until it has attained constant weight for a certain period of time, i.e. until only the dry mass is present. For example, the water content of the graft copolymer B can be determined in a Mettler Toledo Halogen Moisture Analyzer HR73 at 180° C. until a constant weight has been attained for 30 seconds.

The precipitated graft copolymer B is preferably dewatered by centrifugation.

In particular, the dewatered graft copolymer B has a water content of at least 5% by weight, more preferably at least 15% by weight, particularly preferably at least 20% by weight, based on the dewatered graft copolymer B. The dewatered graft copolymer B refers more particularly to the graft copolymer B obtained from the dewatering step b) and supplied to the drying step c). The dewatered graft copolymer B can also be referred to as pre-dewatered graft copolymer B. Step b) or a subsequent wash step preferably affords a graft copolymer B having a water content in the range from 5% to 45% by weight, preferably from 15% to 40% by weight.

In a further embodiment, the dewatering of the graft copolymer B is followed by a wash step, wherein the dewatered graft copolymer B is preferably treated with water or with a mixture of water and a polar organic solvent miscible with water. After the treatment, the water or mixture is preferably removed by filtration and/or centrifugation. This preferably results in a graft copolymer B having a water content of less than or equal to 50% by weight.

Step c)

Step c) of the invention comprises the continuous drying of the dewatered graft copolymer B using a drying gas, wherein the dewatered graft copolymer B is moved by the drying gas and a fluidized bed forms and the drying gas has an inflow temperature $T_{G,in}$ in the range from 50° C. to 160° C., preferably from 55° C. to 155° C., more preferably from 60° C. to 150° C.

Preferably, the graft copolymer B is moved together with the flow of the drying gas, more preferably the graft copolymer B is brought into motion by the flow of drying gas, especially in the vertical direction, thereby giving rise to the fluidized bed.

The drying gas used is preferably air containing nitrogen and oxygen, or nitrogen, and especially a gas containing more than 95% by volume of nitrogen, or any mixtures thereof.

A fluid-bed dryer (fluidized-bed dryer) is preferably employed for the drying in step c). The fluid-bed dryer may in particular include one or more heat exchangers.

Fluid-bed dryers are known to those skilled in the art. More particularly, these are drying devices for particulate, free-flowing materials, as described in Krischer/Kroll, Trocknungstechnik [Drying technology], second volume, Trockner und Trocknungsverfahren [Dryers and drying processes] (Springer-Verlag, 1959). Fluid-bed dryers, also called fluidized-bed dryers, are described for example in the above document on pages 275 to 282.

In fluid-bed dryers a gas, especially warm air or hot gases, especially the drying gas, is typically passed through the material to be dried (i.e. the dewatered graft copolymer B having a water content of less than or equal to 50% by weight) from below (i.e. against the direction of gravity), lifting the material up, but not entraining it. This generally gives rise to a layer in which the particles of the material to be dried are constantly moving up and down and can have the appearance of a bubbling liquid.

This is commonly described as a fluidized bed or else a floating bed or fluidized bed. The flow conditions of the system concerned typically have to be set such that the desired fluidized bed forms. Fluid-bed dryers generally comprise a fluidizing chamber in which the material to be dried sits for example on a sieve tray through which the drying gas flows from below through the material, at least one input device for the (wet) material that is to be dried, and at least one collection and removal device (collector) for the dried material.

The transport of the dewatered and optionally already partially dried graft copolymer B can be effected here for example by an angled inflow, more particularly angled injection, of the drying gas into the fluidized bed.

Additionally or alternatively, the transport can be effected by a repeated movement, especially a back and forth movement, or a vibration of a perforated plate on which the fluidized bed is preferably arranged, such that the dewatered graft copolymer B and optionally the already partially dried graft copolymer B is transported in an essentially horizontal direction from the inflow to the outflow, in particular from an inlet to an outlet of the fluid-bed dryer.

The term variable is more particularly understood as meaning that the mass flow or the water content varies.

The dewatered graft copolymer B can be supplied in step c) at a mass flow that varies over time. The mass flow preferably varies within a range from 25% to 100% based on a maximum mass flow of the dewatered graft copolymer B, more particularly the maximum mass flow that is possible with the apparatus, in the inflow of the graft copolymer B/at the inlet.

The dewatered graft copolymer B can be supplied in step c) with a water content that varies over time. The water content preferably varies between 5% to 20% by weight at the inlet, based on the dewatered graft copolymer B. More particularly, the water content varies by 5% to 50%, based on an average water content of the dewatered graft copolymer B at the inlet.

The dewatered graft copolymer B is preferably supplied in step c) with a water content within a range from 5% by weight to 45% by weight, in particular 15% by weight to 40% by weight, based on the dewatered graft copolymer B.

A ratio of a mass flow of the dewatered graft copolymer B supplied in step c), based on the dried graft copolymer B, to a mass flow of the drying gas supplied in step c) is preferably within a range from 0.01 to 2, especially 0.05 to 1. The mass flow of the dewatered graft copolymer B supplied in step c), based on the dried graft copolymer B, is for example 2000 kg/h to 4000 kg/h, especially 3000 kg/h. The mass flow of the drying gas supplied in step c), which is for example air, is for example within a range from 20 000 kg/h to 40 000 kg/h.

In addition, the dried graft copolymer B obtained in step c) preferably has a water content in the range from 0.05% by weight to 1.5% by weight and a total content of residual monomers of <2000 ppm, in each case based on the dry graft copolymer B.

In particular, the average residence time of the graft copolymer B in the fluidized bed, more particularly in the fluid-bed dryer, is 1 to 60 min, preferably 5 to 50 min, more preferably 10 to 40 min.

In a preferred embodiment, the dewatered graft copolymer B is dried in step c) using a fluid-bed dryer that has one or more heat exchangers integrated into the fluidized bed. In particular, the use of heat exchangers allows the introduction into the fluid bed of additional drying energy over and above the drying energy of the hot drying gas. Common embodiments of heat exchangers, for example plate, finned-tube, tubular, and spiral heat exchangers, are known to those skilled in the art and are described in standard works. For example, fluid-bed dryers may be used, which are described in D. Gehrmann et al., Trocknungstechnik in der Lebensmittelindustrie [Drying technology in the food industry] (Behr's Verlag Gmbh & Co. KG, 1st edition 2009, chapter 2.5.3, Statische Wirbelschichttrockner [Static fluidized-bed dryers], pages 143 to 145). The heat exchangers are preferably operated at temperatures in the range from 50° C. to 100° C., preferably 55° C. to 90° C., more preferably 60° C. to 85° C. In particular, the inlet temperature of the heat exchange medium (for example water) is 50° C. to 100° C., preferably 55° C. to 90° C., more preferably 60° C. to 85° C.

In step c) it is possible for one or more fluid-bed dryers (fluidized-bed dryers) to be operated continuously.

The fluidized bed may be divided into at least two subzones, which can also be referred to as sub-fluidized beds, in particular by at least one weir. The weir can also be referred to as a barrier. The at least one weir dams the horizontal transport of the fluidized bed until a defined fill level is reached and the fluidized bed overcomes the weir from above and/or below. In particular, the at least one weir reduces or prevents back-mixing between successive subzones. When there are at least two subzones, the mode of operation can also be described as semi-continuous.

When there are at least two subzones, each subzone can have its own drying gas inlet and offgas outlet, which makes it possible to measure the inflow temperature $T_{G,in}$ and end temperature $T_{out}$ separately for each subzone. In particular, the end temperature Tout is determined at a last outlet of the dried graft copolymer B and/or of the offgas. The end temperature $T_{out}$ can alternatively be an average temperature of the offgas(es).

The inflow temperature $T_{G,in}$ of the drying gas can vary over the length of the fluidized bed or direction of conveyance, the calculation of the difference $\Delta T_{meas}$ being based in particular on a first inflow temperature $T_{G,in}$, more particularly in the subzone under consideration.

In the case of continuous drying, an overall heating circuit or a plurality of separate heating circuits can be used, each subzone preferably having its own separate heating circuit.

Steps i. to iv. of the process of the invention can also be referred to as a control process. Thus, according to the process of the invention, a degree of drying of the dried graft copolymer B is controlled via the temperature difference $\Delta T_{meas}$. Accordingly, the difference $\Delta T_{meas}$ is preferably a control variable. The difference $\Delta T_{meas}$ is in particular more than 10° C. The mass flow of the supplied drying gas and/or the inflow temperature $T_{G,in}$ are preferably additionally control variables. The proposed control makes it possible to compensate for the dewatered graft copolymer B having a variable mass flow and/or a variable water content.

The control process can be used to control one heating circuit, more than one heating circuit, or all heating circuits.

The maximum product temperature in drying step c), i.e. the maximum temperature that the at least one graft copolymer B reaches during drying step c) (fluidized bed temperature) and which is preferably between the starting temperature $T_{in}$ and the end temperature $T_{out}$, is in particular not more than 90° C., preferably not more than 85° C. and very preferably not more than 80° C. The product temperature typically rises shortly before the end of the drying step. The average product temperature during drying step c) is preferably in the range from 30° C. to 70° C., preferably from 35° C. to 60° C. In a preferred embodiment, the product temperature in a first zone of the dryer is in the range from 30° C. to 90° C., preferably 30° C. to 60° C., particularly preferably 35° C. to 50° C., and in a last zone of the dryer is in the range from 35° C. to 90° C., preferably 40° C. to 80° C.

The inflow temperature $T_{G,in}$ of the drying gas is in particular measured before the drying gas comes into contact with the fluidized bed/with the graft copolymer B, this being done using a thermocouple in particular. The starting temperature $T_{in}$ is measured especially in or optionally above the fluidized bed, in particular at or upstream of a first weir, preferably using a thermocouple.

The starting temperature $T_{in}$ can be measured directly in the inflow/at the inlet or at a short distance from the inlet, since the fluidized bed in the inflow/at the inlet has in particular a homogeneous temperature range within which the temperature does not deviate by more than 5% from a temperature directly in the inflow/at the inlet. The thermocouple is here preferably positioned in the fluidized mixture of dewatered/partially dried graft copolymer B and drying gas. In particular, the starting temperature $T_{in}$ and the end temperature $T_{out}$ are measured a distance apart from one another in the direction of conveyance.

This distance apart is preferably at least 20%, more preferably at least 40%, of a total length of the fluidized bed during continuous drying. When using two or more subzones, the starting temperature $T_{in}$ is preferably measured in the first subzone. The end temperature $T_{out}$ is preferably measured in the offgas, in particular downstream of a last weir/in a last subzone, preferably using a thermocouple.

Preferably, the fluidized bed moves from an inlet of the dewatered graft copolymer B to an outlet of the dried graft copolymer B and the end temperature $T_{out}$ is measured in particular at the outlet. In particular, a thermocouple is arranged at the inlet and at the outlet of the fluidized bed, i.e. at the point where the dewatered graft copolymer B enters the fluidized bed and where the dried graft copolymer B exits the fluidized bed or the fluidized bed exits an area, more particularly in the fluid-bed dryer, in which the continuous drying in step c) is carried out. Alternatively, the end temperature $T_{out}$ may be measured in the offgas at an offgas outlet.

The nominal value $\Delta T_{nom}$ is preferably at least 5° C., further preferably the nominal value $\Delta T_{nom}$ is within a range from 5° C. to 50° C., more preferably from 5° C. to 20° C. The nominal value $\Delta T_{nom}$ is preferably constant over time and more preferably deviates over time by less than 30%, in particular by less than 10%, from an average value for the nominal value $\Delta T_{nom}$. The starting temperature $T_{in}$ is preferably within a range from 20° C. to 50° C., in particular from 25° C. to 40° C.

A constant nominal value $\Delta T_{nom}$ serves to ensure a constant water content and residual monomer content in the dried graft copolymer B. An unchanging water content in the dried graft copolymer B is important for the content of the graft copolymer B in the end product of the thermoplastic molding compound, since the inflow of the dried graft copolymer B in the preferred mixing step d), in which the thermoplastic copolymer A and the dried graft copolymer B are mixed, is in particular controlled gravimetrically, i.e. the mass flow of the dried graft copolymer B is set. If the water content of the dried graft copolymer B is variable, this means that, at a constant mass flow, a variable amount of water and accordingly a variable amount of graft copolymer B dry mass will be supplied. Any water still present in the dried graft copolymer B is preferably completely removed in the mixing step d), which is carried out for example in an extruder. An unchanging content of residual monomers in the dried graft copolymer B results also in an unchanging content of residual monomers in the thermoplastic molding compound comprising the graft copolymer B and the thermoplastic copolymer A.

It is also possible to cool the dried graft copolymer B obtained in step c). Cooling can take place in a further zone, which can also be referred to as a cooling zone, of the fluid-bed dryer or in a separate apparatus. The separate apparatus may be a fluid-bed apparatus. In particular, the dried graft copolymer B is present as a fluidized bed in a cooling step c').

The cooling zone is characterized in that the fluidized bed has a temperature lower than that of the preceding zone. The cooling zone is preferably separated from a preceding drying zone by a weir. If there is a cooling zone in the fluid-bed dryer, the end temperature $T_{out}$ of the fluidized bed is according to step c) ii. measured at the end of a last drying zone, which can also be referred to as a heated zone.

The cooling step c') can accordingly be carried out between step c) and step d). In the cooling step c'), a cooling gas can be supplied that preferably has a temperature of not more than 50° C., more preferably not more than 40° C. The cooling step c') allows caking and/or compaction of the particulate dried graft copolymer B to be reduced. In the cooling step c'), the water content of the dried graft copolymer B remains essentially unchanged. In a preferred embodiment, step c') comprises the cooling the dried graft copolymer B after drying to a temperature of less than 50° C., more preferably to a temperature in the range from 20 to 50° C., in particular by means of a stream of cooling gas. For example, the dried graft copolymer B may be cooled at a head of the fluid-bed dryer by means of a stream of cooling gas, for example air. The temperature of the stream of cooling gas is for example 10° C. to 40° C., preferably 15° C. to 25° C.

Between the drying step c) and the cooling step c') it is possible to include a dwell zone, which is operated at a constant drying gas temperature $T_{G,dwell}$ that is not regulated in the dwell zone.

The drying gas temperature $T_{G,dwell}$ in the dwell zone is preferably within a range from 30° C. to 100° C., more preferably within a range from 40° C. to 80° C. This zone can serve to further reduce the residual monomer content.

The drying step of the invention makes it possible in particular to achieve particularly rapid and even drying. The drying step of the invention in particular ensures rapid and effective heat transfer between the drying gas and the graft copolymer B to be dried, while on the other hand avoiding high temperatures in said graft copolymer B itself.

The drying in step c) is preferably carried out using a drying gas selected from air and/or nitrogen, wherein the drying is carried out using a fluid-bed dryer and the drying gas has a temperature in the range from 50° C. to 160° C., preferably 55° C. to 140° C., more preferably 60° C. to 120° C.

Further preferably, the drying in step c) is carried out by means of a drying gas selected from air and/or nitrogen, wherein the drying is carried out using a fluid-bed dryer that has at least one heat exchanger integrated into the fluid bed, wherein the drying gas has a temperature in the range from 50° C. to 160° C., preferably 55° C. to 140° C., more preferably 60° C. to 120° C., and the at least one heat exchanger has a temperature in the range from 55° C. to 165° C., preferably 60° C. to 145° C., more preferably 65° C. to 125° C.

In particular, the drying in step c) is carried out by means of a drying gas selected from air and/or nitrogen, wherein the drying is carried out using a fluid-bed dryer, preferably a fluid-bed dryer that has at least one heat exchanger integrated into the fluid bed, the drying gas has a temperature in the range from 50° C. to 160° C., preferably 50° C. to 120° C., and the average residence time of the graft copolymer B in the fluid-bed dryer is 1 to 60 min, preferably 5 to 50 min, more preferably 10 to 40 min.

In a preferred embodiment of the invention, the drying described above is continued for a further 10 to 30 min, preferably 15 to 20 min, in the dwell zone in particular, from the time at which a water content of 10% by weight, preferably 7.5% by weight, more preferably 5% by weight (or less), is achieved.

In a further preferred embodiment of the invention, the drying described above, in the dwell zone in particular, is continued for a further 5 to 30 min, preferably 5 to 25 min, from the time at which a water content of 2% by weight, preferably 1% by weight, more preferably 0.5% by weight (or less), is achieved.

The mass flow of drying gas during drying in step c) and/or in the dwell zone and/or in the cooling step c') is preferably 1 to 80 times, more preferably 2 to 50 times, the mass flow of graft copolymer B based on the dried graft copolymer B.

In a preferred embodiment, the dried graft copolymer B has a water content in the range from 0.01% to 1% by weight, preferably 0.1% to 0.8% by weight, particularly preferably 0.1% to 0.5% by weight, more preferably 0.2% to 0.4% by weight, in each case based on the dried graft copolymer B, in particular the total dried graft copolymer B.

The drying step of the invention makes it possible for example to reduce the total content of residual styrene in graft copolymer B based on an acrylic ester-styrene-acrylonitrile (ASA) copolymer to a value of less than 500 ppm, preferably less than 400 ppm, more preferably less than 300 ppm, and the total content of residual acrylonitrile in graft copolymer B based on an acrylic ester-styrene-acrylonitrile (ASA) copolymer to a value of less than 100 ppm, preferably less than 75 ppm, more preferably less than 50 ppm, in each case based on the dry graft copolymer B.

Residual monomers are to be understood as meaning unreacted monomers and transformation products thereof and also oligomers. In particular, the total content of residual monomers in graft copolymer B based on an acrylic ester-styrene-acrylonitrile copolymer (ASA) comprises the content of styrene, acrylonitrile, butyl acrylate, and ethylbenzene, preferably the content of acrylonitrile and styrene, in the polymer.

In a preferred embodiment, the dried graft copolymer B based on an acrylic ester-styrene-acrylonitrile (ASA) copolymer has a water content in the range from 0.05% to 0.6% by weight, particularly preferably from 0.1% to 0.5% by weight, more preferably 0.1% to 0.4% by weight, and a total content of residual styrene in graft copolymer B based on an acrylic ester-styrene-acrylonitrile (ASA) copolymer of less than 500 ppm, preferably less than 400 ppm, more preferably less than 300 ppm, and a total content of residual acrylonitrile in graft copolymer B based on an acrylic ester-styrene-acrylonitrile (ASA) copolymer of less than 100 ppm, preferably less than 75 ppm, more preferably less than 50 ppm, in each case based on the dry graft copolymer B.

The drying step of the invention makes it possible in particular to reduce the total content of residual monomers, in particular styrene, in graft copolymer B based on a polybutadiene (ABS) to a value of less than or equal to 2000 ppm, in particular less than or equal to 1000 ppm, in each case based on the dry graft copolymer B.

In particular, the total content of residual monomers in graft copolymer B based on a polybutadiene (ABS) comprises the content of styrene, acrylonitrile, butadiene, and 4-vinylcyclohexene (VCH), preferably the content of acrylonitrile, styrene, and 4-vinylcyclohexene, more preferably the content of styrene and 4-vinylcyclohexene, in graft copolymer B.

In a preferred embodiment, the dried graft copolymer B based on a polybutadiene (ABS) and obtained in step c) has a water content in the range from 0.05% to 0.8% by weight, preferably 0.1% to 0.5% by weight, more preferably 0.1% to 0.3% by weight, and a total residual styrene content of less than or equal to 2000 ppm, preferably less than or equal to 1000 ppm, in particular in the range from 10 to 2000 ppm, preferably from 20 to 1000 ppm, in each case based on the dry graft copolymer B.

The term "ppm" means for the purposes of the present application "mg/kg".

Step d)

Step d) comprises the mixing together of the thermoplastic copolymer A, the dried graft copolymer B from step c), optionally the further polymeric component(s) (C), and optionally the further component(s) K.

Preferably, step d) comprises the mixing together of the thermoplastic copolymer A, the precipitated, dewatered, and dried graft copolymer B, optionally the further polymeric component C, and optionally the at least one further component K, preferably selected from fillers, additives, and auxiliaries. This mixing preferably takes place in an extruder.

The methods and devices for carrying out step d) are known to those skilled in the art. Typically, step d) comprises melt compounding and/or melt extrusion and is preferably carried out in internal kneaders, extruders and/or twin-shaft screws.

The mixing in step d) preferably takes place at temperatures of 200° C. to 300° C.

The thermoplastic copolymer A, the at least one dried graft copolymer B from step c), and optionally further components K can be mixed together in a known manner either successively or simultaneously. It is also possible for some components to be initially mixed together at temperatures of 15° C. to 40° C., in particular at room temperature (about 20° C.), and the temperature later increased to 200° C. to 300° C., optionally with the addition of further components.

The composition of the thermoplastic molding compound of the invention is described above in connection with the process of the invention.

The molding compounds of the invention can be used to produce molded articles and/or films of any kind. These can be produced by injection molding, extrusion (guide tubes, profiles, fibers, films, and sheets) and blow molding processes and also by calendering and rolling (for sheets and films). Another form of processing is the production of molded articles by deep-drawing from preproduced sheets or films and the film back-injection process. Examples of such molded articles are films, profiles, housing parts of all kinds, for example for household appliances such as juicers, coffee machines, mixers; for office machines such as monitors, printers, copiers; automotive exterior and interior parts; plates, pipes, electrical installation ducts, windows, doors, and other profiles for the construction sector (interiors and exterior applications) and also electrical and electronic parts such as switches, plugs, and sockets.

In particular, the molding compounds of the invention can be used for example for the production of the following molded articles: interior fittings for rail vehicles, ships, aircraft, buses, and other motor vehicles, exterior bodywork parts in the automotive sector, housings for electrical devices containing small transformers, housings for devices for information processing and transmission, housings and covers for medical devices, massage devices and housings therefor, toy vehicles for children, flat wall elements, housings for safety devices, thermally insulated transport containers, devices for the husbandry or care of small animals, molded articles for sanitary and bathroom equipment, cover grilles for ventilation openings, molded articles for garden and tool sheds, and housings for garden tools.

The embodiments described above relating to the thermoplastic molding compound, in particular the thermoplastic copolymer A and the graft copolymer B, and relating to process steps a) to d) apply in a corresponding manner to the molding compound of the invention and to molded articles produced therefrom.

BRIEF DESCRIPTION OF THE DRAWINGS

Example embodiments of the invention are shown in the drawing and are elucidated in more detail in the description that follows.

In the FIGURE:

FIG. 1 shows a schematic representation of continuous drying in a fluid-bed dryer.

FIG. 1 shows in schematic form a continuous drying of a dewatered graft copolymer B 4 in a fluid-bed dryer 13. A drying gas 3 and the dewatered graft copolymer B 4 are supplied to the fluid-bed dryer 13, wherein the dewatered graft copolymer B 4 is moved in the fluid-bed dryer 13 by the drying gas 3 and a fluidized bed 5 forms. The angled inflow of the drying gas 3 in the illustrated embodiment results in the transport of the fluidized bed 5 in the fluid-bed dryer 13 in a horizontal direction of conveyance 27 and the discharge of an offgas 7 from the fluidized bed 5. The fluidic behavior of the fluidized bed 5 means that a vertical inflow of the drying gas 3 is alternatively also possible.

A starting temperature $T_{in}$ of the fluidized bed 5 is measured in an inflow 9 of the dewatered graft copolymer B 4 at an inlet 21 into the fluidized bed 5. In addition, an end temperature $T_{out}$ of the fluidized bed 5 is measured in the outflow 11 of the dried graft copolymer B 4 at an outlet 23 from the fluidized bed 5. The difference $\Delta T_{meas}$ between the end temperature $T_{out}$ and the starting temperature $T_{in}$ is calculated and serves as a control variable for continuous drying. The difference $\Delta T_{meas}$ is compared with a defined nominal value $\Delta T_{nom}$ and the mass flow of the supplied drying gas 3 and/or an inflow temperature $T_{G,in}$ of the drying gas 3 are set in accordance therewith.

In the illustrated embodiment, the fluidized bed 5 is divided into a first subzone 15 and a second subzone 17 by a weir 19. In addition, in the illustrated embodiment the second subzone 17 is adjoined by a cooling area in which a cooling gas 25 is supplied instead of the drying gas 3.

The invention is not limited to the example embodiments described herein. Rather, a large number of modifications is possible within the range specified by the claims. The invention is elucidated further by the examples, FIGURE, and claims that follow:

EXAMPLES

For the continuous drying of an ASA graft copolymer B, a fluid-bed dryer having a perforated base area of 0.24 m$^2$ was used, to which the dewatered graft copolymer B was supplied. A drying gas having a volume flow of 8 m$^3$/min was supplied. The average residence time of the graft copolymer B in the fluidized bed was 20 minutes. A temperature measurement was carried out in the fluidized bed both at the start and at the end of the fluid bed, i.e. at the inlet and at the outlet of the graft copolymer B.

Six examples (E) and three comparative examples (CE) are shown in Table 1. A first graft copolymer B I having a median particle diameter of 98 nm had a residual monomer content of 808 ppm before drying. A second graft copolymer B II having a median particle diameter of 550 nm had a residual monomer content of 821 ppm before drying.

TABLE 1

| Example | Graft copolymer B Inlet [kg/h] | Water content Inlet [% by wt.] | $T_{in}$ [° C.] | $T_{G,in}$ [° C.] |
|---|---|---|---|---|
| CE I.1 | 15 | 31 | 36 | 80 |
| CE I.2 | 18 | 31 | 36 | 80 |
| E I.1 | 15 | 34 | 36 | 90 |
| E I.2 | 15 | 31 | 36 | 87 |
| E I.3 | 15 | 31 | 36 | 93 |
| CE II | 15 | 36 | 35 | 85 |
| E II.1 | 15 | 36 | 35 | 92 |
| E II.2 | 15 | 36 | 35 | 96 |

| Example | $T_{out}$ [° C.] | $\Delta T_{meas}$ [° C.] | Water content Outlet [% by wt.] | Residual monomer content Outlet [ppm] |
|---|---|---|---|---|
| CE I.1 | 36 | 0 | 2 | 192 |
| CE I.2 | 36 | 0 | 5 | 510 |
| E I.1 | 41 | 5 | 1 | <20 |
| E I.2 | 41 | 5 | 1 | <20 |

TABLE 1-continued

| | | | | |
|---|---|---|---|---|
| E I.3 | 50 | 14 | 0.7 | <20 |
| CE II | 36 | 1 | 3 | 212 |
| E II.1 | 40 | 5 | 1 | <20 |
| E II.2 | 50 | 15 | 0.6 | <20 |

Unlike in the comparative examples, the content of residual monomers in the dried graft copolymer B was consistently reduced to less than 20 ppm with an adequately large $\Delta T_{meas}$, irrespective of the water content of the supplied dewatered graft copolymer B. A $\Delta T_{meas}$ here of at least 5° C. resulted in a significant reduction in the content of residual monomers and to a consistently low water content in the graft copolymer B at the outlet.

The graft copolymer B advantageously dried in this way is used with a SAN matrix, for example, to produce thermoplastic molding compounds and molded articles that have good mechanical and optical properties and no disagreeable odor.

LIST OF REFERENCE SIGNS

3 Drying gas
4 Graft copolymer B
5 Fluidized bed
7 Offgas
9 Inflow
11 Outflow
13 Fluid-bed dryer
15 First subzone
17 Second subzone
19 Weir
21 Inlet
23 Outlet
25 Cooling gas
27 Direction of conveyance

The invention claimed is:

1. A process for producing a thermoplastic molding compound comprising at least one thermoplastic copolymer A and at least one graft copolymer B, comprising the following steps:

a) precipitating the at least one graft copolymer B after an emulsion polymerization, by adding a precipitation solution;

b) dewatering the precipitated graft copolymer B, affording a dewatered graft copolymer B having a water content of less than or equal to 50% by weight, based on the total dewatered graft copolymer B;

c) continuously drying the dewatered graft copolymer B, wherein a drying gas and the dewatered graft copolymer B are supplied, the dewatered graft copolymer B is moved by the drying gas and a fluidized bed forms, the drying gas has an inflow temperature $T_{G,in}$ ranging from 50° C. to 160° C., and dried graft copolymer B and an offgas are discharged, wherein i a starting temperature $T_{in}$ of the fluidized bed is measured in the inflow of the dewatered graft copolymer B, ii. an end temperature $T_{out}$ of the fluidized bed is measured in the outflow of the dried graft copolymer B and/or of the offgas, iii. a difference $\Delta T_{meas}$ between the measured end temperature $T_{out}$ and the measured starting temperature $T_{in}$ is calculated and the difference $\Delta T_{meas}$ compared with a nominal value $\Delta T_{nom}$, which is at least 2° C., and iv. the end temperature $T_{out}$ is adjusted by increasing a mass flow of supplied drying gas and/or the inflow temperature $T_{G,in}$ of the drying gas when the difference $\Delta T_{meas}$ is smaller than the nominal value $\Delta T_{nom}$, or decreasing a mass flow of supplied drying gas and/or the inflow temperature $T_{G,in}$ of the drying gas when the difference $\Delta T_{meas}$ is greater than the nominal value $\Delta T_{nom}$; and d) mixing together the thermoplastic copolymer A, the dried graft copolymer B, optionally further polymeric component(s) C, and optionally further component(s) K, selected from fillers, additives, and auxiliaries.

2. The process of claim 1, wherein a fluid-bed dryer is employed for the drying in step c).

3. The process of claim 1, wherein the fluidized bed is divided into at least two subzones.

4. The process of claim 1, wherein the fluidized bed moves from an inlet of the dewatered graft copolymer B to an outlet of the dried graft copolymer B and that the end temperature $T_{out}$ is measured.

5. The process of claim 1, wherein the nominal value $\Delta T_{nom}$ is at least 5° C.

6. The process of claim 1, wherein the starting temperature $T_{in}$ ranges from 20° C. to 50° C.

7. The process of claim 1, wherein the dewatered graft copolymer B is supplied in step c) with a variable mass flow.

8. The process of claim 1, wherein the dewatered graft copolymer B is supplied in step c) with a variable water content.

9. The process of claim 1, wherein the nominal value $\Delta T_{nom}$ is constant over time.

10. The process of claim 1, wherein the dewatered graft copolymer B is supplied in step c) with a water content ranging from 5% by weight to 45% by weight, based on the dewatered graft copolymer B.

11. The process of claim 1, wherein the graft copolymer B is based on an acrylic ester-styrene-acrylonitrile copolymer or on a polybutadiene.

12. The process of claim 1, wherein the dried graft copolymer B obtained in step c) is based on an acrylic ester-styrene-acrylonitrile copolymer (ASA) and has a water content ranging from 0.05% by weight to 0.6% by weight, a total content of styrene of less than 500 ppm, and a total content of acrylonitrile of less than 100 ppm, in each case based on the dry graft copolymer B, or the dried graft copolymer B obtained in step c) is based on a acrylonitrile-butadiene-styrene (ABS) copolymer and has a water content ranging from 0.05% by weight to 0.8% by weight and a total content of styrene of less than or equal to 2000 ppm, in each case based on the dry graft copolymer B.

13. The process of claim 1, wherein the dewatered graft copolymer B obtained in step c) is cooled.

14. The process of claim 1, wherein the step b) of dewatering the precipitated graft copolymer B is performed by centrifugation, filtration, or a combination thereof.

15. The process of claim 1, wherein the fluidized bed is divided into at least two subzones by at least one weir.

16. The process of claim 4, wherein the end temperature $T_{out}$ is measured at the outlet.

17. The process of claim 1, wherein the nominal value $\Delta T_{nom}$ ranges from 5° C. to 50° C.

18. The process of claim 1, wherein the starting temperature $T_{in}$ ranges from 25° C. to 40° C.

19. The process of claim 1, wherein the dewatered graft copolymer B is supplied in step c) with a water content ranging from 15% by weight to 40% by weight, based on the dewatered graft copolymer B.

* * * * *